United States Patent [19]

Perez

[11] 4,275,819
[45] Jun. 30, 1981

[54] TWENTY CIGARETTE DISPENSER

[76] Inventor: Sergio J. Perez, 311 W. 97th St., (Apt. 3E), New York, N.Y. 10025

[21] Appl. No.: 59,044

[22] Filed: Jul. 19, 1979

[51] Int. Cl.³ .............................................. A24F 15/04
[52] U.S. Cl. .................................... 221/186; 221/198; 221/232
[58] Field of Search ............... 221/186, 188, 190, 191, 221/195, 228, 229, 232, 246, 255, 143–149, 198

[56] References Cited

U.S. PATENT DOCUMENTS

| | | | |
|---|---|---|---|
| 591,845 | 10/1897 | Kerr | 221/229 |
| 1,794,559 | 3/1931 | Sprague | 221/229 X |
| 2,090,700 | 8/1937 | Power | 221/195 |
| 3,100,060 | 8/1963 | Calixto | 221/188 X |
| 3,845,881 | 11/1974 | Sachko | 221/144 |

Primary Examiner—F. J. Bartuska

[57] ABSTRACT

A cigarette dispenser for placement upon a dashboard of an automotive vehicle; the dispenser includes a frame for resting on the dashboard top, and a cigarette case containing a row of 20 cigarettes that are pushed by a spring for each cigarette to successively align with a dispensing hole in the case; and a push rod on the frame in order that when the case is pressed into the frame, the push rod pushes a cigarette out of the dispensing hole.

3 Claims, 5 Drawing Figures

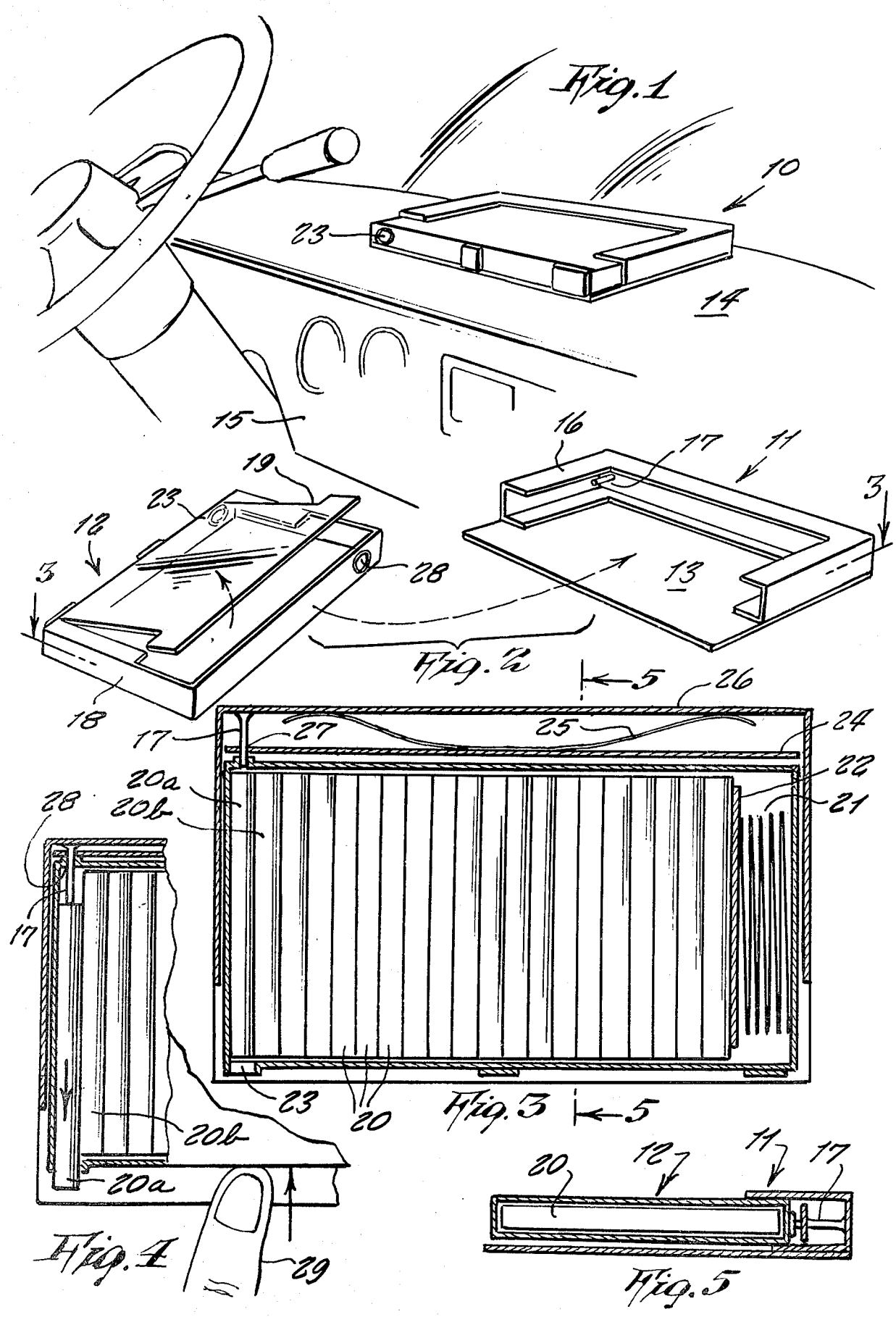

TWENTY CIGARETTE DISPENSER

SUMMARY OF THE INVENTION

This invention relates generally to automotive accessories. More specifically it relates to a cigarette dispenser.

It is well known to most motorists who smoke cigarettes, that while most automobiles are provided with a convenient cigarette lighter on the dashboard for lighting cigarettes, the motorist is still obliged to reach into a pocket or purse for obtaining the cigarette. This is not easy to do as he or she must keep at least one hand on the steering wheel at all times when the vehicle is moving, and then with his other hand obtain the cigarette pack and remove a cigarette therefrom. This situation is accordingly in need of an improvement.

Therefore, it is a principal object of the present invention to provide a cigarette dispenser for convenient placement upon an automobile dashboard, and which needs only a slight push by a finger to remove a cigarette; and which can be done quickly and easily with one hand, while the other hand is on the steering wheel, and wherein the drive need not take his eyes off the road, so the invention promotes highway safety.

Another object is to provide a cigarette dispenser which holds twenty cigarettes in a straight single row, so that the dispenser is low and does not obstruct windshield vision.

BRIEF DESCRIPTION OF THE DRAWING

FIG. 1 is a perspective view showing the invention placed on top of an automobile dashboard.

FIG. 2 shows the cigarette case pulled out from the frame.

FIG. 3 is a cross sectional view shown on line 3—3 of FIG. 2.

FIG. 4 is a fragmentary similar view showing the cigarette case being depressed forwardly dispensing a cigarette.

FIG. 5 is a cross sectional view taken on line 5—5 of FIG. 3.

PREFERRED EMBODIMENT

Referring now to the drawing in greater detail. The reference numeral 10 represents a straight line twenty cigarette dispenser according to the present invention; wherein there is a frame 11 inside of which a cigareete case 11 is slid.

The frame includes a flat plate 13 for resting upon a top 14 of an automobile dashboard 15, and a U-shaped channel 16 affixed on top of the plate. A push rod 17 is rigidly affixed in the frames rear wall.

The case comprises a thin box 18 with pivoted door 19 on top in order that a single row of twenty cigarettes 20 can be contained therein. A compression spring 21 in one end of the case is connected to a pressure bar 22 that pushes the cigarettes towards the other end to be dispensed out of the dispensing outlet 23 on a front side of the case.

The case is slid into the channel of the frame until it abuts against a pressure bar 24 of the frame. A compression leaf spring 25 normally keeps the bar 24 away from a rear wall 26 of the frame. The push rod 17 affixed to the rear wall 26 extends forwardly through a hole 27 in the bar 24. The case includes a hole 28 on the rear side of the case, so that the push rod can enter therein.

In operative use when a motorist wishes to obtain a cigarette, he simply pushes a finger 29 against a front side of the case, thus pushing the case rearwardly into the frame and against the pressure bar 24, causing the push rod to enter the case hole 28 and push the cigarette on the extreme end 20a forwardly out of the dispensing outlet 23 a short distance as shown on FIG. 4. The motorist then releases pushing the case, and the leaf spring 25 pushes the case forwardly to the position shown on FIG. 3. The person then grasps the outwardly protruding end of cigarette 20a and pulls it out of the case for use. The compression spring 21 then pushes the remaining cigarettes, causing the next cigarette 20b to be aligned between the hole 28 and dispensing outlet 23 in order to be dispensed next when the device is again operated.

Both the frame and case are made of transparent hard plastic attractively decorated as the manufacturer desires.

It is understood that the above device maybe varied in construction, as long as the same is within the spirit and scope of the appended claims.

I claim:

1. A straight line twenty cigarette dispenser, comprising in combination; a frame for placement upon a top of an automobile dashboard, and a cigarette case slid into said frame; said case comprising a flat box having a pivoted door on top; said case holding therein a single row of twenty cigarettes, and said frame comprising a flat rectangular plate and a channel on the top side of said plate, the channel extends along three edges of said top side; a pressure plate inside an intermediate leg of said channel, a compression spring between said pressure plate and a rear wall of said channel intermediate leg urging said pressure plate against said case when slid in said channel; a forwardly extending push rod on said channel rear wall passing through a hole in said pressure plate and through a hole in a rear wall of said case.

2. The combination as set forth in claim 1, wherein a cigarette dispensing opening is through a front wall of said case; said cigarette dispensing opening being axially aligned with said case rear wall hole, and said push rod, whereby a cigarette in said case located between said rear wall hole and said front wall dispensing opening is outwardly pushed by said push rod, when said case is urged against said pressure plate.

3. The combination as set forth in claim 2, wherein said case rear hole and dispensing opening are at one end of said rear and front walls, and a side of one of said cigarettes rest against a side wall of said case; the rest of said row of cigarettes bears against the other side of said one cigarette; a second pressure plate adjacent the end of said row of cigarettes, which is opposite the said one cigarette; and a compression spring between said second pressure plate and an opposite side wall of said case for successively moving each cigarette of said row into the position of the first said dispensing opening and said push rod.

* * * * *